US007591351B2

(12) United States Patent
Fischer

(10) Patent No.: US 7,591,351 B2
(45) Date of Patent: Sep. 22, 2009

(54) BRAKE FOR A LIFT

(75) Inventor: Daniel Fischer, Ollon (CH)

(73) Assignee: Inventio AG, Hergiswil (CH)

( * ) Notice: Subject to any disclaimer, the term of this patent is extended or adjusted under 35 U.S.C. 154(b) by 12 days.

(21) Appl. No.: 10/968,679

(22) Filed: Oct. 19, 2004

(65) Prior Publication Data

US 2005/0087407 A1 Apr. 28, 2005

(30) Foreign Application Priority Data

Oct. 27, 2003 (EP) ................................ 03405767

(51) Int. Cl.
*B60T 13/04* (2006.01)

(52) U.S. Cl. .................... 188/171; 188/73.44; 188/161; 188/164; 303/9

(58) Field of Classification Search ................ 188/72.2, 188/161, 164, 171, 153 A, 250 B, 370, 73.45; 303/9; 187/375, 288, 351
See application file for complete search history.

(56) References Cited

U.S. PATENT DOCUMENTS

| | | | | |
|---|---|---|---|---|
| 3,937,304 | A * | 2/1976 | Brix | 188/73.38 |
| 4,050,548 | A * | 9/1977 | Margetts | 188/71.8 |
| 4,596,313 | A * | 6/1986 | Metoyer | 188/18 A |
| 4,638,894 | A | 1/1987 | Sitabkhan et al. | |
| 4,795,004 | A * | 1/1989 | Bauer | 188/106 P |
| 5,014,828 | A | 5/1991 | Baldassarre | |
| 5,255,760 | A * | 10/1993 | Lamb et al. | 188/1.11 L |
| 5,337,878 | A * | 8/1994 | Mehlert et al. | 198/323 |
| 5,648,644 | A * | 7/1997 | Nagel | 187/288 |
| RE36,034 | E | 1/1999 | Sheridan | |
| 6,019,199 | A * | 2/2000 | Heidenreich | 188/73.34 |
| 6,161,653 | A * | 12/2000 | Skalski et al. | 187/305 |
| 6,186,291 | B1 * | 2/2001 | Barnard | 188/170 |
| 6,193,026 | B1 * | 2/2001 | Sevilleja et al. | 188/153 R |
| 6,719,101 | B2 * | 4/2004 | Hugel | 187/376 |

FOREIGN PATENT DOCUMENTS

| | | | |
|---|---|---|---|
| CA | 2 037 231 | C | 9/1991 |
| JP | 041 33 988 | A | 5/1992 |
| JP | 08240231 | A | 9/1996 |

* cited by examiner

*Primary Examiner*—Robert A Siconolfi
*Assistant Examiner*—Mariano Sy
(74) *Attorney, Agent, or Firm*—Ladas & Parry LLP

(57) ABSTRACT

A self-centering brake for a lift provides for the same braking moment in the case of normal operation and in the case of failure of a brake half. The brake consists of a housing which is U-shaped in cross-section, wherein a limb of the U corresponds with a brake half. The brake halves are of identical construction. An active brake lining and a passive brake lining are provided for each brake half. The active brake lining is loaded by a spring force of a compression spring. In the case of failure of a brake half the passive brake lining takes over the function of the active brake lining.

9 Claims, 3 Drawing Sheets

BRAKE FOR A LIFT

The invention relates to a brake for a lift, which brake consists of two brake halves, wherein a compression spring for activation of the brake and an actuator for release of the brake are provided for each brake half and wherein the compression spring and actuator act on at least one active brake lining, which produces a braking force at a brake surface when the actuator is deactivated.

BACKGROUND OF THE INVENTION

A brake device for a hoist frame drivable by means of a linear motor has become known from patent specification DE 41 06 595, wherein load cells produce a releasing signal. Brakes arranged at the hoist frame embrace the guide rails arranged in the conveying shaft, wherein a brake is provided for each guide rail. The brake has a brake shoe for each limb side of the guide rail. Actuating elements produce, for each brake shoe, braking forces on the guide rail by means of the brake shoe, wherein the action of a spring activates the brake and a hydraulic cylinder opposes the spring force and releases the brake.

A disadvantage of such known equipment resides in the fact that the brake produces different braking moments in the case of normal operation and in the case of failure of a brake half. In the known brake one brake half generates the necessary braking moment; the two brake halves together produce twice the braking moment, which in the case of normal operation can lead to slipping of the cable on the drive pulley. The strands in the case of a steel cable are, and the casing in the case of a synthetic fibre cable is, thereby very highly loaded or excessively worn.

A lift drive with a disc brake, the brake calliper of which is mounted to be floating, has become known from specification JP 04133988. The brake is actuated by means of a compression spring and released by means of an actuator acting against the compression spring. When the brake is released the brake calliper is moved by means of another compression spring into the initial position.

A disadvantage of that type of equipment resides in the fact that in the event of spring breakage or wearing away of a brake lining the brake fails.

BRIEF DESCRIPTION OF THE INVENTION

The present invention overcomes the disadvantages of the prior art, and is in the form of a brake which has optimised properties with respect to both operation and safety.

In accordance with the invention, a lift brake has two brake halves, each of which is provided with an active brake lining and a means for pressing the lining against a brake surface and an actuator for withdrawing the lining from the brake surface. The means for pressing the lining may be a compression spring, and the actuator may be an electromagnet assembly which, when activated, overcomes the compression spring force. The brake is mounted for floating travel in a direction perpendicular to the brake surface. Each brake half also includes at least one passive brake lining. Upon failure of a brake half, the lining pressing means associated with the other brake half, through the floating action of the brake, presses the passive brake lining of the failed brake half against the brake surface to maintain appropriate braking force. By incorporating an abutment for the active brake lining the active brake lining can also function as a passive lining.

The advantages achieved by the invention are substantially to be seen in that the necessary braking moment is maintained and that the double redundancy necessary for lift drives is nevertheless guaranteed. The redundancy is maintained even in the event of spring failure or wearing away of a brake lining, as the brake consists of two independent halves that generate the braking moment necessary for normal operation. In the event of failure of a brake half the brake according to the invention nevertheless generates the necessary braking moment. In the case of a fault the passengers are subjected to less high loads and the lift is mechanically loaded to a lesser degree. In addition, with the gentler retardation undesired triggering of a safety brake device due to the mass inertia of the lift's limiter cable is also avoided. In the case of an emergency stop, excessive decelerations do not occur, particularly in the case of lift installations with large reserves of traction, which in turn preserves the mechanical system and avoids slipping of the cable on the drive pulley. Cage position data derived from a signal generator of the motor shaft is correctly maintained for control.

BRIEF DESCRIPTION OF THE DRAWINGS

The invention is explained in more detail on the basis of the accompanying figures, in which.

DETAILED DESCRIPTION OF THE INVENTION

Figure 1:
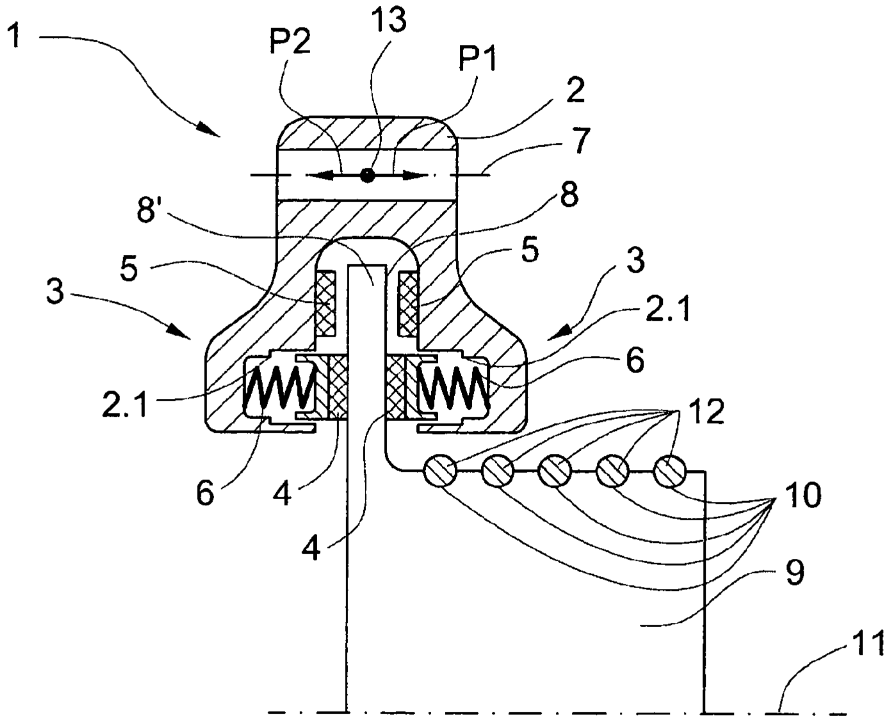
FIG. 1 is a schematic illustration of the brake according to the invention in normal operation.
Figure 3:
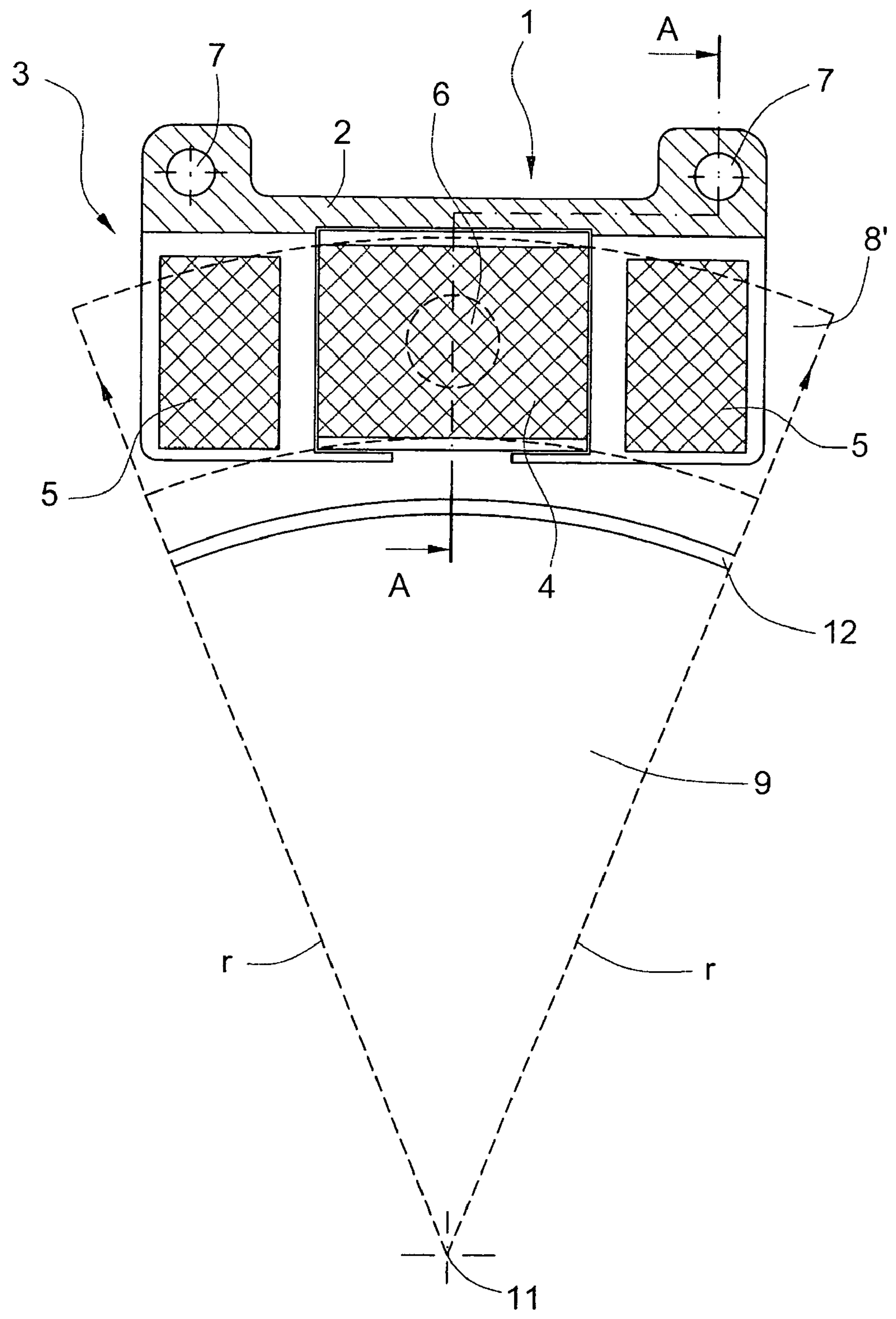
FIG. 3 is a side view of a brake half according to the invention.
Figure 4:
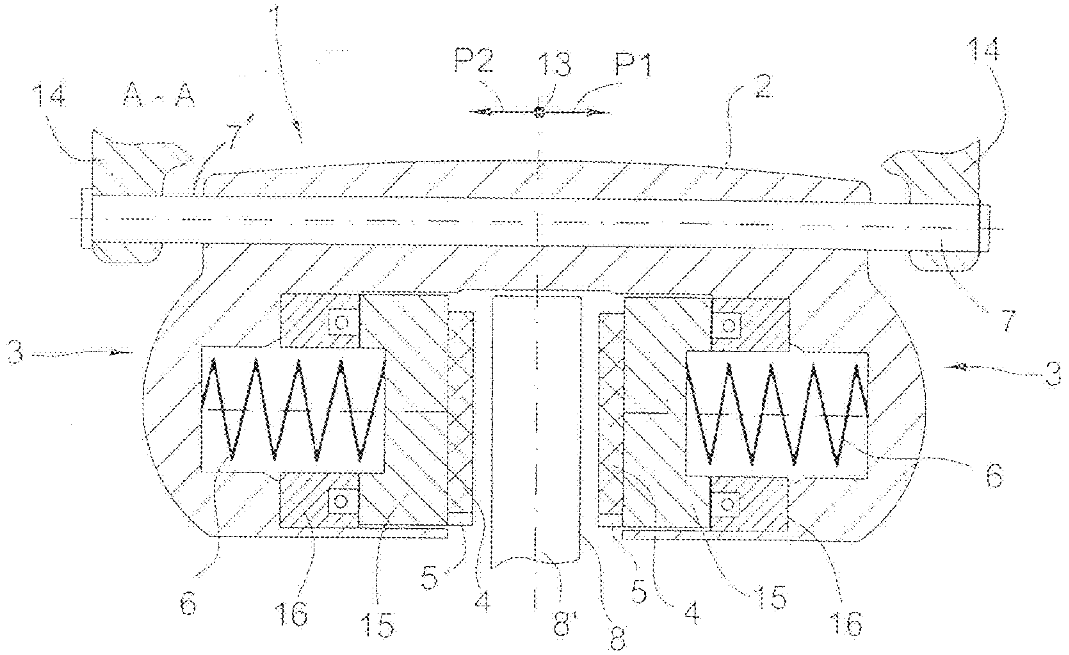
FIG. 4 is a section view along the line A-A of FIG. 3.
Figure 5:
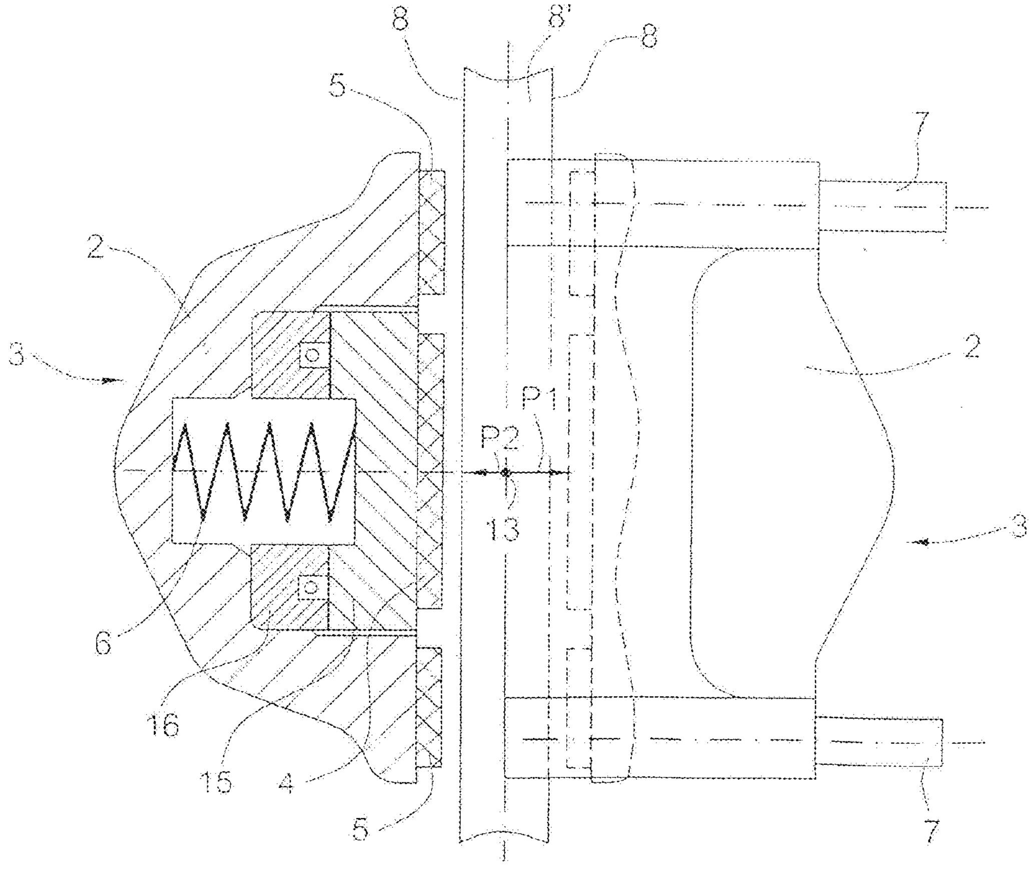
FIG. 5 is a plan view of the brake according to the invention.

FIG. 1 is a schematic illustration of the brake 1 according to the invention in normal operation. The brake 1 comprises a housing 2 which is U-shaped in cross-section, wherein a limb of the U corresponds to a brake half 3. The brake halves 3 are of identical construction. An active brake lining 4 and at least one additional or passive brake lining 5 are provided for each brake half 3. In a variant of embodiment the additional brake lining 5 can, as explained further below, be omitted. Each additional or passive brake lining 5 is arranged at an inner side of the limbs of housing 2. The active brake lining 4 is loaded by the spring force of a compression spring 6. Not illustrated is an actuator which is explained further below and which in the activated state opposes the spring force. The housing is mounted to be floating along a first axis 7. It is to be noted that the additional linings 5 are shown in both FIGS. 1 and 2 displaced from their actual locations adjacent the active linings, as depicted in FIGS. 3-5.

In the case of normal operation the active brake linings 4 act on a brake disc 8' which serves as a brake surface 8 and which is part of a drive pulley 9. Cables 12 guided in cable grooves 10 of the drive pulley 9 rotating about a second axis 11 move a lift cage (not illustrated) or a counterweight (not illustrated) of a lift.

The brake 1 according to the invention can also be arranged at the lift cage or at the counterweight, wherein a free limb of a guide rail, for example, can serve as the brake surface.

The brake 1 is self-centering and can, thanks to the floating mounting at the first axis 7, move about a center position 13 symbolized by a dot. The possible directions of movement of the brake 1 are symbolized by arrows P1 and P2.

Figure 2:
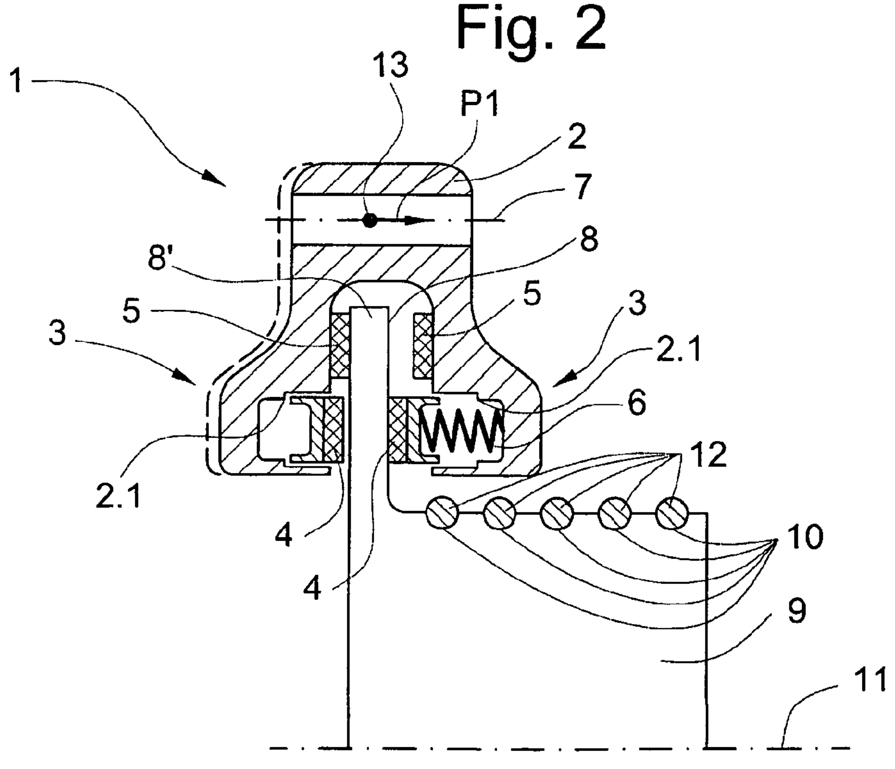
FIG. 2 is a schematic illustration of the brake according to the invention in the event of a spring breakage of a brake half.

FIG. 2 is a schematic illustration of the brake 1 according to the invention in the case of failure of one brake half 3. With, for example, a broken compression spring 6 or wearing away of the active brake lining 4, the corresponding one brake half 3 is ineffective. The spring force of the compression spring 6 of the other brake half 3 moves the housing 2 in the direction symbolized by the arrow P1, wherein the passive brake lining 5 of the one brake half 3 comes into contact with the brake disc 8'. The initial position of the brake 1 is illustrated by a dashed line. As explained further below, the braking force in the case of normal operation is maintained in the case of failure of a brake half 3.

FIG. 3 is a side view of a brake half 3 of the brake 1 according to the invention. The active brake lining 4 is arranged centrally and an additional or passive brake lining 5 arranged at the housing 2 is provided at each side of the brake lining.

A section along the line A-A of FIG. 3 is shown in FIG. 4. The first axis 7 of the brake 1 is arranged at a brake 14 of the drive unit or of the lift cage or counterweight and runs along the axis of mounting rod 7'. The brake 1 is shown in a relieved state and is mounted to be floating, wherein it can move along the first axis 7. Each compression spring 6 is supported at one end at the housing 2 and at the other end at an armature plate 15 of a brake magnet 16. Brake magnet 16 and armature plate 15 form the above-mentioned actuator. In the illustrated state, the brake 1 is released, wherein the brake magnet 16 is activated and the armature plate 15 carrying the active brake lining 4 is attracted and wherein the force of the brake magnet 16 opposes the spring force of the compression spring 6. When the brake magnet 16 is deactivated, the compression spring 6 presses the armature plate 15, together with the active brake lining 4, against the brake disc 8, wherein the active brake lining 4 produces the requisite braking force. If both brake halves 3 act equally, the brake 1 positions itself in the center position 13. If the brake halves 3 operate unequally, the brake 1 displaces, thanks to the floating mounting at the first axis 7, in one or the other direction P1, P2, rod 7' thus forming means for mounting the brake for floating travel along axis 7 in a direction perpendicular to brake surface 8.

F*ig*. 5 shows a plan view of the brake 1 according to the invention, wherein the one brake half 3 is cut away. The brake 1 shown released. In case of failure of a brake half, the two additional or passive brake linings 5 act instead of the active brake lining 4.

In an alternative embodiment the additional brake lining 5 can be omitted. In the event of spring breakage, the active brake lining 4 acts in this case as an additional brake lining, which then rests against an abutment 2.1 as symbolically shown in FIG. 1 and FIG. 2. As shown in FIG. 4 and FIG. 5, the brake magnet 16 acts as an abutment. This brake variant has redundancy in the case of spring breakage and continues to operate with the necessary braking moment. If the entire brake half 3 fails, for example in the case of wearing away of the active brake lining 4, the brake 1 fails.

The brake 1 can, for example, also be arranged at the lift cage or at the counterweight and, for example, act on a limb of a guide rail. In this case the limb of the guide rail takes the place of brake disc 8'. The brake linings can then act on opposite sides of the guide rail as described in EP 0 648 703 B1.

The braking moment in normal operation is calculated according to the following formula:

$$M_n=2*F_n*\mu*r \qquad [1]$$

$M_n$: braking moment in normal operation $F_n$: braking force (compression spring 6) acting on the active brake lining 4

μ: co-efficient of friction between active brake lining 4 and brake disc 8 r: mean spacing of the brake 1 from the center point of the second axis 11

The braking moment in the case of failure of a brake half 3 is calculated according to the following formula:

$$M_f=(F_n+F_p)*\mu*r \qquad [2]$$

$M_f$: braking moment in the case of failure of a brake half 3

$F_n$: braking force (compression spring 6) acting on the active brake lining 4

$F_p$: braking force (compression spring 6) acting on the additional or passive brake lining 5

μ: co-efficient of friction between active/passive brake lining 4/5 and brake disc 8 r: mean spacing of the brake 1 from the centre point of the second axis 11 when $F_n=F_p$, then $M_n=M_f$.

The braking moment of the brake thus remains the same in the case of normal operation and in the case of failure of a brake half 3, assuming r remains constant and the friction at the axis 7 can be disregarded.

I claim:

1. A brake for a lift, comprising a generally u-shape brake housing with two rigidly connected limbs maintained at a fixed spacing from each other, each forming a brake half having an active brake lining, a compression spring for activation of the active brake lining and an actuator for release of the active brake lining, the compression spring producing a braking force against a brake surface located between the limbs when the actuator is deactivated, at least one fixed passive brake lining in addition to and independent from the active brake lining located on each brake half for pressing against the brake surface by the compression spring of the other brake half in the event of a failure of the brake half, and means for mounting the brake for floating travel of the brake housing in a perpendicular direction to the brake surface for engaging the brake surface with the passive brake lining on the brake half by the action of the compression spring of the other brake half in said event of failure of the brake half.

2. The brake according to claim 1, further wherein each brake half has a brake lining carrier for the active brake lining and an abutment, the brake lining carrier resting against the abutment when the brake half is an non-activated state to position the active brake lining to serve as a passive brake lining.

3. The brake according to claim 1, characterized in that the passive brake lining are at least two in number on each brake half.

4. The brake according to claim 2, characterized in that the brake is arranged to be floating at a first axis, the at least one passive brake lining of a brake half being arranged and positioned at the housing of the brake to come to bear against the brake surface in the case of failure of the brake half.

5. The brake according to claim 1, characterized in that the actuator is a brake magnet with an armature plate, wherein the active brake lining is arranged at the armature plate.

6. The brake according to claim 2, characterized in that the actuator is a brake magnet with an armature plate, wherein the active brake lining is arranged at the armature plate.

7. The brake according to claim 1, characterized in that the brake is arranged at a drive unit.

8. The brake according to claim 1, characterized in that the brake is arranged at a lift cage or counterweight.

9. The brake according to claim 1, characterized in that a guide rail of the lift forms the brake surface.

* * * * *